US011079948B2

(12) United States Patent
Lee

(10) Patent No.: US 11,079,948 B2
(45) Date of Patent: Aug. 3, 2021

(54) MEMORY SYSTEM FOR UPDATING FIRMWARE WHEN SPO OCCURS AND OPERATING METHOD THEREOF

(71) Applicant: SK hynix Inc., Icheon (KR)

(72) Inventor: Joo Young Lee, Seoul (KR)

(73) Assignee: SK hynix Inc., Icheon (KR)

( * ) Notice: Subject to any disclaimer, the term of this patent is extended or adjusted under 35 U.S.C. 154(b) by 68 days.

(21) Appl. No.: 16/569,309

(22) Filed: Sep. 12, 2019

(65) Prior Publication Data

US 2020/0233594 A1    Jul. 23, 2020

(30) Foreign Application Priority Data

Jan. 18, 2019 (KR) .......................... 10-2019-0006823

(51) Int. Cl.
*G06F 3/06* (2006.01)
*G06F 8/65* (2018.01)

(52) U.S. Cl.
CPC .......... *G06F 3/0632* (2013.01); *G06F 3/0604* (2013.01); *G06F 3/0659* (2013.01); *G06F 3/0679* (2013.01); *G06F 8/65* (2013.01)

(58) Field of Classification Search
CPC ........ G06F 8/65; G06F 3/0632; G06F 3/0604; G06F 3/0659; G06F 3/0679
See application file for complete search history.

(56) References Cited

U.S. PATENT DOCUMENTS

| | | | |
|---|---|---|---|
| 6,907,602 B2 * | 6/2005 | Tsai | G06F 8/65 717/168 |
| 9,563,497 B2 * | 2/2017 | Dasari | G06F 11/0793 |
| 10,394,542 B1 * | 8/2019 | Poenaru | G06F 3/065 |
| 10,664,598 B1 * | 5/2020 | Righi | G06F 8/71 |
| 2007/0165040 A1 * | 7/2007 | Wang | G06F 11/1433 345/536 |
| 2007/0169088 A1 * | 7/2007 | Lambert | G06F 11/0793 717/168 |
| 2007/0169098 A1 * | 7/2007 | Kikuchi | G06F 11/1433 717/168 |
| 2010/0235617 A1 * | 9/2010 | Chen | G06F 11/1417 713/2 |
| 2010/0257519 A1 * | 10/2010 | Chang | G06F 8/65 717/168 |
| 2011/0179406 A1 * | 7/2011 | Ohama | G06F 11/1433 717/168 |
| 2012/0124567 A1 * | 5/2012 | Landry | G06F 8/654 717/168 |

(Continued)

FOREIGN PATENT DOCUMENTS

| KR | 20100110652 A | 10/2010 |
|---|---|---|
| KR | 20170126230 A | 11/2017 |

*Primary Examiner* — Glenn A. Auve

(57) ABSTRACT

A memory system and an operating method thereof are disclosed. An operating method of a memory system including a nonvolatile memory device and a controller configured to control the nonvolatile memory device includes the controller updating original data of firmware stored in the nonvolatile memory device, the controller transmitting a notification signal, which notifies a host device of completion of the updating of the original data, to the host device when the updating of the original data is completed, and the controller updating backup data of the firmware stored in the nonvolatile memory device after the notification signal is transmitted.

14 Claims, 7 Drawing Sheets

(56) References Cited

U.S. PATENT DOCUMENTS

| | | | |
|---|---|---|---|
| 2013/0166893 A1* | 6/2013 | Dusija | G06F 8/654 |
| | | | 713/2 |
| 2015/0154029 A1* | 6/2015 | Lu | G06F 9/4403 |
| | | | 713/2 |
| 2015/0331688 A1* | 11/2015 | Shimizu | G06F 8/654 |
| | | | 717/170 |
| 2016/0246585 A1* | 8/2016 | Li | H04L 63/0853 |
| 2016/0306623 A1* | 10/2016 | Su | G06F 13/4022 |
| 2017/0097819 A1* | 4/2017 | Ozturk | G06F 8/65 |
| 2017/0322796 A1* | 11/2017 | Kim | G06F 8/654 |
| 2019/0079748 A1* | 3/2019 | Chu | G06F 3/0653 |
| 2019/0325139 A1* | 10/2019 | Dewan | H04L 63/0428 |
| 2020/0272378 A1* | 8/2020 | Tagawa | H04L 69/16 |
| 2020/0401688 A1* | 12/2020 | Michishita | G06F 21/44 |

* cited by examiner

FIG.3

| FIRST MEMORY BLOCK (ORIGINAL DATA) | SECOND MEMORY BLOCK (BACKUP DATA) |
| --- | --- |
| FW_0 | FW_0 |
| FW_1 | FW_1 |
| FW_2 | FW_2 |
| ⋮ | ⋮ |
| FW_n | FW_n |

# MEMORY SYSTEM FOR UPDATING FIRMWARE WHEN SPO OCCURS AND OPERATING METHOD THEREOF

CROSS-REFERENCES TO RELATED APPLICATION

The present application claims priority under 35 U.S.C. § 119(a) to Korean Patent Application Number 10-2019-0006823, filed on Jan. 18, 2019, in the Korean Intellectual Property Office, which is incorporated herein by reference in its entirety.

BACKGROUND

1. Technical Field

Various embodiments generally relate to a semiconductor device, and more particularly, to a memory system and an operating method thereof.

2. Related Art

In recent years, the paradigm for computer environments moves toward ubiquitous computing which allows people or users to use their or commonly supplied computing systems anytime and everywhere. In the era of ubiquitous computing, the demand for portable electronic devices, such as a mobile phone, a digital camera, a laptop computer, and so on, is increasing rapidly. Such a portable electronic device generally includes a memory system that employs a memory device. The memory system may be used to store data used in the portable electronic device.

Since a memory system using a memory device does not have a mechanical driving unit (e.g., a mechanical arm with a read/write head) as compared with a hard disk device, it may have excellent stability and durability, a fast information access rate, and low power consumption. Such a memory system may include a universal serial bus (USB) memory device, a memory card having various interfaces, a universal flash storage (UFS) device, a solid state drive (SSD), or the like.

SUMMARY

Embodiments are provided to technology which efficiently updates firmware of a memory system.

In an embodiment of the present disclosure, an operating method of a memory system including a memory device and a controller, the method including updating, by the controller, original data of firmware stored in the memory device; transmitting, by the controller, a notification signal, which notifies a host device of completion of the updating of the original data, to the host device when the updating of the original data is completed; and In an embodiment of the present disclosure, a memory system may include: a memory device configured to store original data and backup data of firmware; and a controller configured to control the memory device. The controller controls the memory device to update the original data of the firmware, transmit a notification signal, which notifies a host device of completion of the updating of the original data, to the host device when the updating of the original data is completed, and update the backup data of the firmware after the notification signal is transmitted.

According to an embodiment of the present disclosure, firmware of a memory system can be efficiently updated when a power shut-down occurs during an operation of updating the firmware.

These and other features, aspects, and embodiments are described below in the section entitled "DETAILED DESCRIPTION".

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 3 illustrates a block structure of a nonvolatile memory device of FIG. 1;

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
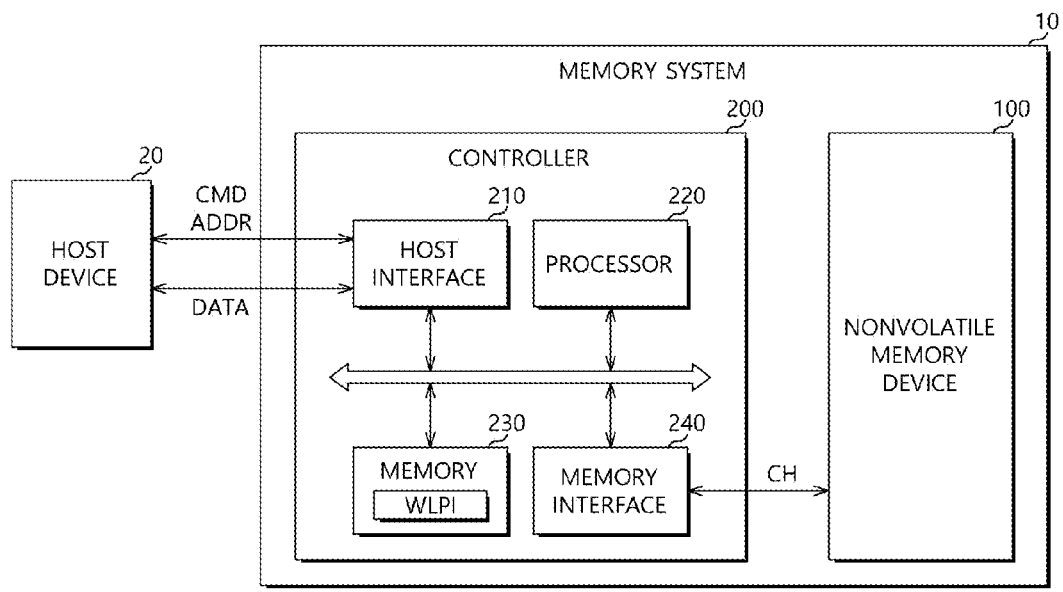
FIG. 1 illustrates a configuration of a memory system according to an embodiment of the present disclosure.

FIG. 1 illustrates a configuration of a memory system 10 according to an embodiment.

Referring to FIG. 1, the memory system 10 may store data to be accessed by a host device 20 such as a mobile phone, an MP3 player, a laptop computer, a desktop computer, a game player, a television (TV), an in-vehicle infotainment system, or the like. The memory system 10 may be referred to as a data storage device.

The memory system 10 may be implemented as any one of various types of storage devices according to an interface protocol corresponding to the host device 20. The various types of storage devices may include a solid state drive (SSD), a multimedia card in the form of MMC, eMMC, RS-MMC, or micro-MMC, a secure digital card in the form of SD, mini-SD, or micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The memory system 10 may be manufactured with any one of various types of packages. The various types of packages may include a package on package (POP), a system in package (SIP), a system on chip (SOC), a multi-chip package (MCP), a chip on board (COB), a wafer-level fabricated package (WFP), a wafer-level stack package (WSP), and the like.

The memory system 10 may include a nonvolatile memory device 100 and a controller 200.

The nonvolatile memory device 100 may operate as a storage medium of the memory system 10. The nonvolatile memory device 100 may include any one of various types of nonvolatile memory devices according to a memory cell. The various types of nonvolatile memory devices may include a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound, and the like.

Although FIG. 1 shows one nonvolatile memory device 100 for illustrative convenience, the memory system 10 may include a plurality of nonvolatile memory devices. The present disclosure may be equally applied to the memory system 10 including the plurality of nonvolatile memory devices.

Figure 10:
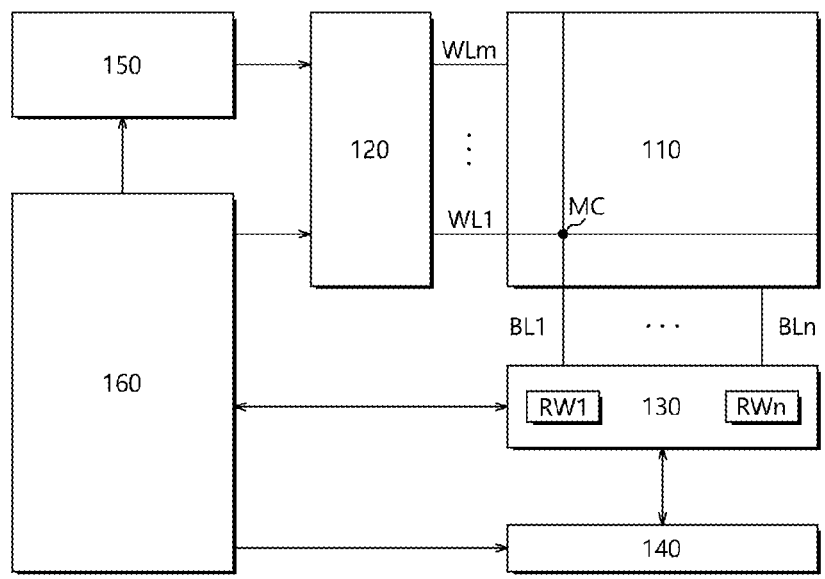
FIG. 10 illustrates a configuration of a nonvolatile memory device included in a memory system according to an embodiment of the present disclosure.

Referring to FIG. 10, the nonvolatile memory device 100 may include a memory cell array 110 including a plurality of memory cells MCs that are disposed in intersection regions of a plurality of word lines WL1 to WLm and a plurality of bit lines BL1 to BLn, m and n being positive integers. The memory cell array 110 may include a plurality of memory blocks, and each of the plurality of memory blocks may include a plurality of pages.

For example, each of the memory cells MCs in the memory cell array 110 may be a single level cell (SLC) configured to store a single bit data (for example, 1-bit data) or a multi-level cell (MLC) configured to store 2 or more bits of data. The MLC may store 2-bit data, 3-bit data, 4-bit data, or the like. In general, a memory cell configured to store 2-bit data may be referred to as an MLC, a memory cell configured to store 3-bit data may be referred to as a triple level cell (TLC), and a memory cell configured to store 4-bit data may be referred to as a quadruple level cell (QLC). However, for illustrative convenience, the memory cells configured to store 2-bit to 4-bit data may be collectively referred to as the MLC in embodiments.

The memory cell array 110 may include a plurality of memory cells of SLCs and MLCs. The memory cells MCs of the memory cell array 110 may be arranged in a two-dimensional (2D) horizontal structure or a 3D vertical structure. The other components of the nonvolatile memory device 100 shown in FIG. 10 will be described later.

Referring back to FIG. 1, the controller 200 may control an overall operation of the memory system 10 by driving firmware or software loaded into a memory 230. The controller 200 may drive a code-type instruction or algorithm such as the firmware or software. The controller 200 may be implemented with hardware or a combination of hardware and software.

The controller 200 may include a host interface 210, a processor 220, the memory 230, and a memory interface 240. Although not shown in FIG. 1, the controller 200 may further include an error correction code (ECC) engine. The ECC engine may generate parity data by performing ECC encoding on write data provided from the host device 20, and perform ECC decoding on read data read out from the nonvolatile memory device 100 using parity data corresponding to the read data.

The host interface 210 may perform interfacing between the host device 20 and the memory system 10 according to a protocol corresponding to the host device 20. For example, the host interface 210 may communicate with the host device 20 according to any one protocol among a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, a PCI-E protocol, and so on.

The processor 220 may include a micro control unit (MCU), a central processing unit (CPU), or the like that has been manufactured to execute codes. The processor 220 may process a request transmitted from the host device 20. To process the request transmitted from the host device 20, the processor 220 may drive a code-type instruction or algorithm (for example, firmware) loaded into the memory 230 and control internal function blocks such as the host interface 210, the memory 230, and the memory interface 240, and the nonvolatile memory device 100.

The processor 220 may generate control signals for controlling an operation of the nonvolatile memory device 100 based on requests transmitted from the host device 20, and provide the generated control signals to the nonvolatile memory device 100 through the memory interface 240.

The memory 230 may include a random access memory such as a dynamic random access memory (DRAM) or a static random access memory (SRAM), but embodiments are not limited thereto. The memory 230 may store the firmware driven by the processor 220. The memory 230 may also store data required for driving the firmware, for example, meta data. That is, the memory 230 may operate as a working memory of the processor 220.

The memory 230 may include a data buffer configured to temporarily store write data from the host device 20 that is to be transmitted to the nonvolatile memory device 100 or to temporarily store read data from the nonvolatile memory device 100 that is to be transmitted to the host device 20. That is, the memory 230 may further operate as a buffer memory of the processor 220.

The memory interface 240 may perform interfacing between the controller 200 and the nonvolatile memory device 100 and control the nonvolatile memory device 100 according to control of the processor 220. The memory interface 240 may provide the control signals generated by the processor 220 to the nonvolatile memory device 100.

The control signals may include a command, an address, and the like for controlling the nonvolatile memory device 100. The memory interface 240 may provide the write data stored in the data buffer of the memory 230 to the nonvolatile memory device 100 or store the read data transmitted from the nonvolatile memory device 100 in the data buffer of the memory 230.

Figure 2:
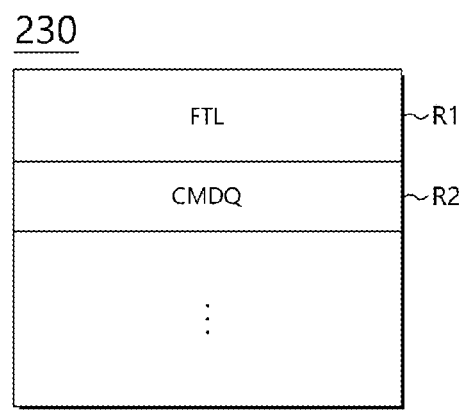
FIG. 2 illustrates a configuration of a memory of FIG. 1.

FIG. 2 illustrates a configuration of the memory 230 of FIG. 1.

Referring to FIG. 2, the memory 230 may include a first region R1 for storing the firmware, e.g., a flash translation layer FTL, and a second region R2 used as a command queue CMDQ for queuing commands corresponding to requests provided from the host device 20. However, it is apparent to a person of skill in the art that the memory 230 may further include one or more regions used for various purposes such as a region used as a write data buffer configured to temporarily store write data, a region used as a read data buffer configured to temporarily store read data, a region used as a map cache buffer configured to cache map data, and so on.

The memory 230 may include a region configured to store system data, meta data, and the like. In an embodiment, workload pattern information WLPI may be stored in the region of the memory 230 in which the system data, metal data, and the like are to be stored.

When the nonvolatile memory device 100 includes a flash memory device, the processor 220 may control an intrinsic operation of the nonvolatile memory device 100 and drive software, e.g., the flash translation layer FTL, to provide device compatibility to the host device 20. The host device 20 may recognize and use the memory system 10 as a general storage device such as a hard disc through the driving of the flash translation layer FTL.

The flash translation layer FTL stored in the first region R1 of the memory 230 may include modules configured to perform various functions and meta data required for driving the modules. The flash translation layer FTL may be also stored in a system region (not shown) of the nonvolatile memory device 100. When the memory system 10 is powered on, the flash translation layer FTL may be loaded from the system region of the nonvolatile memory device 100 to the first region R1 of the memory 230.

FIG. 3 illustrates a block structure of the nonvolatile memory device 100 of FIG. 1 according to an embodiment.

Referring to FIG. 3, the nonvolatile memory device 100 may store original data and backup data of the firmware for driving the memory system 10 in a first memory block and a second memory block, respectively. The first memory block is different from the second memory block. A plurality of pieces of firmware FW_0 to FW_n for driving the memory system 10 may be stored in the first and second memory blocks as the original data and the backup data for each firmware.

In a booting operation, the memory system 10 may complete the booting operation by reading the original data stored in the first memory block, storing the read original data in the memory 230, and executing the original data stored in the memory 230. However, when the memory system 10 cannot complete the booting operation based on the original data, the memory system 10 may complete the booting operation by reading the backup data stored in the second memory block, storing the read backup data in the memory 230, and executing the backup data stored in the memory 230.

To prevent erroneous data from affecting the other data even though an error is generated in any one of the original data and the backup data when updating the firmware, the memory system 10 may store the original data and the backup data of the firmware in different memory blocks of the nonvolatile memory device 100.

The memory system 10 may perform a rebooting operation based on the backup data stored in the second memory block when the rebooting operation cannot be performed based on the original data stored in the first memory block because of power shut-down (for example, sudden power off (SPO)) occurred during the updating operation for the original data stored in the first memory block. This rebooting operation will be described in detail with reference to FIG. 4.

Figure 4:
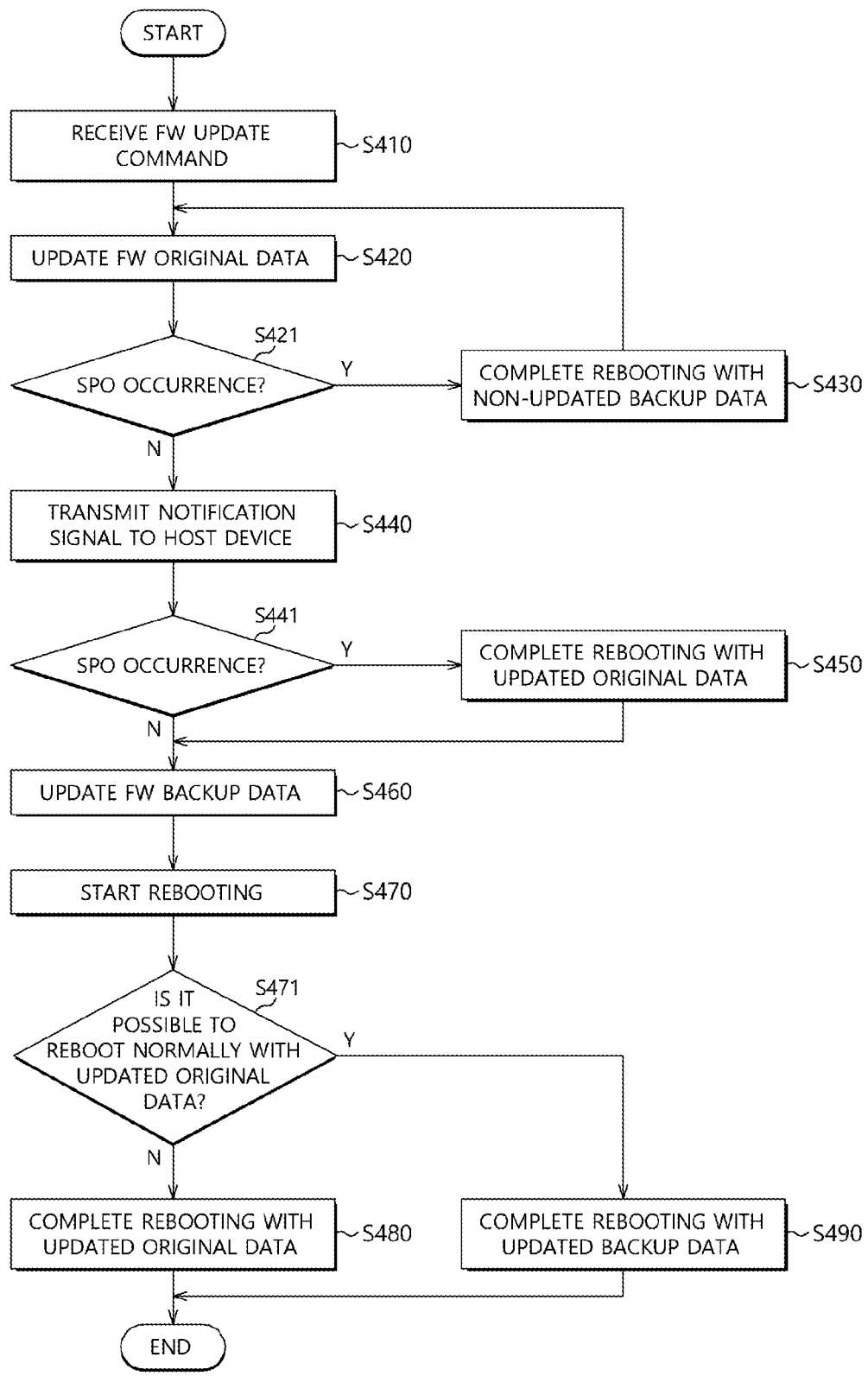
FIG. 4 illustrates an operation of a memory system according to an embodiment of the present disclosure.

FIG. 4 illustrates an operating method of a memory system according to an embodiment. The operation method of FIG. 4 will be described with reference to FIGS. 1 and 3.

Referring to FIG. 4, at S410, the host device 20 of FIG. 1 may transmit a firmware update command and update data to the memory system 10. The firmware update command may include information for identifying target firmware that is to be updated, and the update data may be used to update the target firmware.

At S420, the memory system 10 of FIG. 1 may perform an updating operation on original data of the target firmware based on the firmware update command and the update data.

In an embodiment, when a plurality of pieces of firmware are stored in the nonvolatile memory device 100, the memory system 10 may perform the updating operation on the target firmware corresponding to the firmware update command.

In an embodiment, the original data may be stored in a memory block (for example, the first memory block of FIG. 3) included in the memory system 10.

At S421, if it is determined that SPO occurred before the updating operation on the original data is completed, for example, when the SPO occurred during the updating operation on the original data or before a notification signal for notifying the host device 20 of the completion of the updating operation on the original data is transmitted to the host device 20, the memory system 10 may perform a reboot operation at S430.

In this reboot operation, the host device 20 may expect the memory system 10 to be rebooted with the non-updated firmware since the SPO occurred during the updating operation and thus the notification signal is not yet transmitted to the host device 20 from the memory system 10.

Accordingly, the memory system 10 may complete the reboot operation by reading non-updated backup data of the target firmware from the nonvolatile memory device 100, storing the backup data in the memory 230, and executing the backup data stored in the memory 230. This is because the original data is not reliable due to the occurrence of the SPO during the updating operation on the original data.

In an embodiment, the backup data may be stored in a memory block (for example, the second memory block of FIG. 3) that is different from the memory block (for example, the first memory block) in which the original data is stored. The first and second memory blocks may be separately controlled and independently accessed from each other.

When the memory system 10 is rebooted based on the backup data due to the occurrence of the SPO during the updating operation on the original data, the memory system 10 may perform the updating operation on the original data again at S420.

If it is determined that the updating operation on the original data has been completed without the occurrence of the SPO at S421, the memory system 10 may transmit the notification signal, which notifies the host device 20 of the completion of the updating operation on the original data, to the host device 20 at S440.

At S441, if it is determined that the SPO occurred after the notification signal had been transmitted to the host device 20, the memory system 10 may perform a reboot operation with updated firmware at S450. In the rebooting operation, the memory system 10 may complete the reboot operation by reading the updated original data from the nonvolatile memory device 100, storing the read updated original data in the memory 230, and executing the updated original data stored in the memory 230. Since the notification signal has been received from the memory system 10, the host device 20 may expect the reboot operation to be completed with the updated firmware when the memory system 10 is rebooted. Accordingly, the memory system 10 may complete the reboot operation using the updated firmware, i.e., the updated original data, at S450.

If it is determined, at S441, that the SPO does not occur after the notification signal has been transmitted to the host device 20 or after the reboot operation has been completed with the updated original data at S450, an updating operation on the backup data may be performed at S460. For example, the memory system 10 may perform the updating operation on the backup data stored in the nonvolatile memory device 100 based on the update data.

In another embodiment, if the SPO occurs after the notification signal has been transmitted to the host device 20 and before the updating operation on the backup data is completed, i.e., if the SPO occurs during the updating operation on the backup data, the memory system 10 may perform the reboot operation with the updated original data as at S450, and then perform the updating operation on the backup data again.

At S470, the memory system 10 may be rebooted. For example, when the updating operation on the backup data is completed at S460, the memory system 10 may start the reboot operation with the updated firmware.

At S471, the memory system 10 may determine whether or not the updated original data is erroneous. When it is determined that rebooting with the updated original data is possible at S471, the memory system 10 may be rebooted with the updated original data at S480. For example, the memory system 10 may complete the reboot operation by reading the updated original data from the nonvolatile memory device 100, storing the read updated original data in the memory 230, and executing the updated original data stored in the memory 230 when the updating operations on the original data and the backup data of the target firmware have been completed through S420 and S460.

On the other hand, if it is determined that rebooting with the updated original data is impossible at S471, the memory system 10 may be rebooted with the updated backup data at S490. For example, the memory system 10 may complete the reboot operation by reading the updated backup data from the nonvolatile memory device 100, storing the read updated backup data in the memory 230, and executing the updated backup data stored in the memory 230 when the reboot operation cannot be performed based on the updated original data after the update operations on the original data and the backup data of the firmware have been completed through S420 and S460.

In another embodiment, the memory system 10 may not perform the reboot operation when the updating operation on the backup data has been completed at S460. This is because the memory system 10 was already rebooted using the updated original data before the updating operation on the backup data is completed. That is, steps S470 to 490 in FIG. 4 may be omitted.

Figure 5:
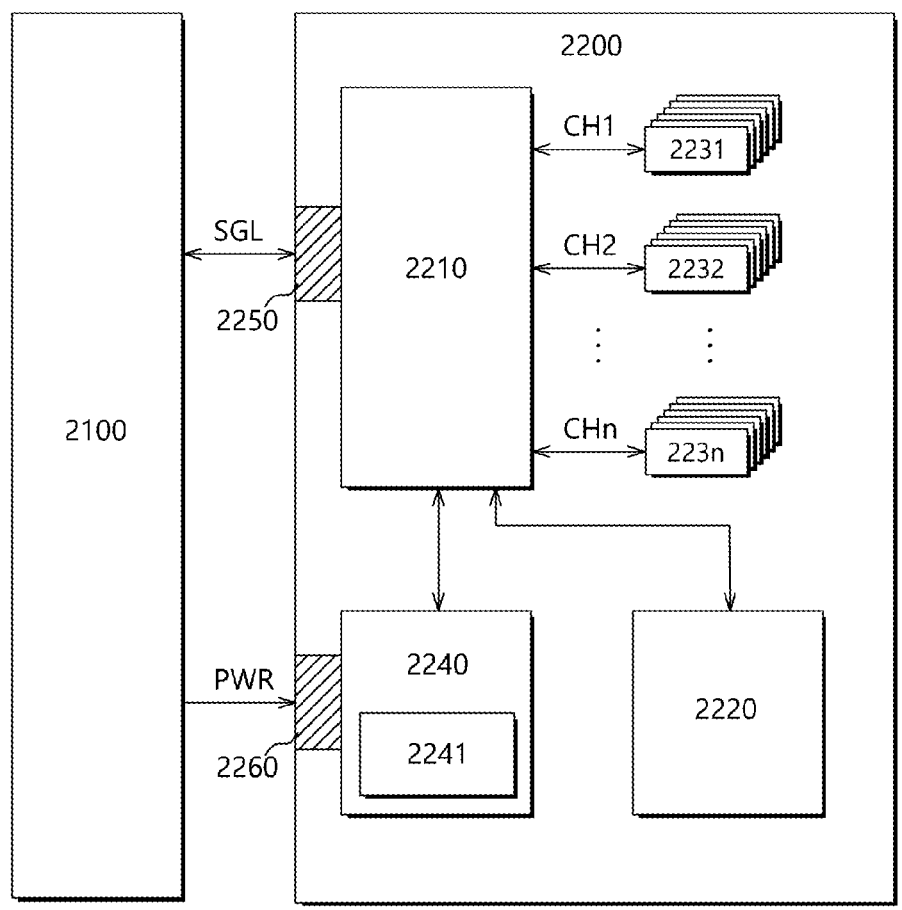
FIG. 5 illustrates a data processing system including a solid state drive (SSD) according to an embodiment of the present disclosure.

FIG. 5 illustrates a data processing system 2000 according to an embodiment. Referring to FIG. 5, the data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200.

The buffer memory device 2220 may temporarily store write data to be stored in the nonvolatile memory devices 2231 to 223n. Further, the buffer memory device 2220 may temporarily store read data read out from the nonvolatile memory devices 2231 to 223n. The data temporarily stored in the buffer memory device 2220 may be transmitted to the host device 2100 or to the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to one channel may be coupled to the same signal bus and the same data bus.

The power supply 2240 may provide power PWR inputted through the power connector 2260 to the internal function blocks of the SSD 2200. The power supply 2240 may include an auxiliary power supply 2241. The auxiliary power supply 2241 may supply power to the SSD 2200 so that the SSD 2200 is to be normally terminated when the SPO occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interface scheme between the host device 2100 and the SSD 2200.

In an embodiment, the SSD 2200 of FIG. 5 may be implemented with the memory system 10 shown in FIG. 1, and thus the operation described with reference to FIG. 4 may be applied to an operation of the SSD 2200.

Figure 6:
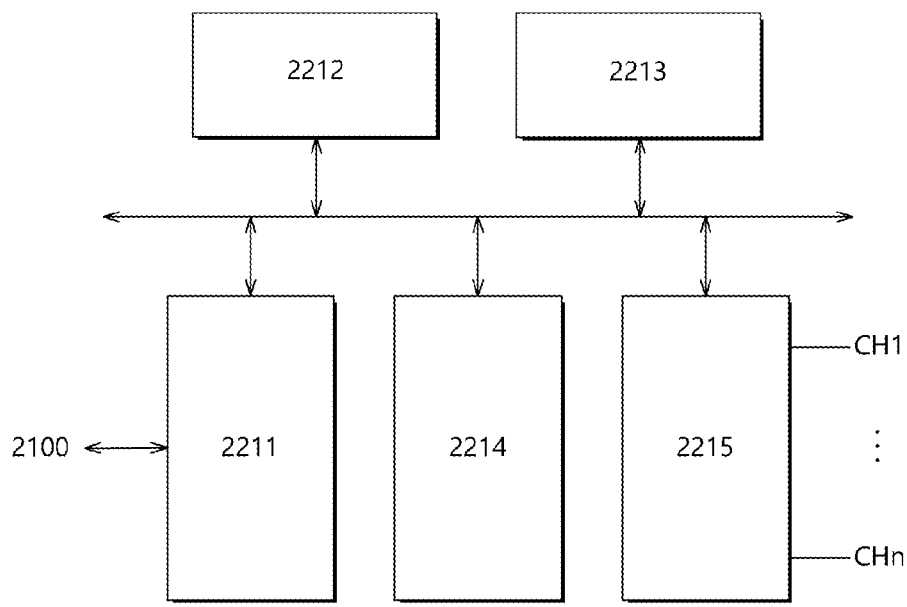
FIG. 6 illustrates a controller of FIG. 5.

FIG. 6 illustrates an example of the controller 2210 shown in FIG. 5. Referring to FIG. 6, the controller 2210 may include a host interface unit 2211, a control unit 2212, a random access memory 2213, an error correction code (ECC) unit 2214, and a memory interface unit 2215.

The host interface unit 2211 may provide interfacing between the host device 2100 and the SSD 2200 according to a protocol corresponding to the host device 2100. For example, the host interface unit 2211 may communicate with the host device 2100 through any one protocol among SD, USB, MMC, embedded MMC (eMMC), PCMCIA, PATA, serial SATA, SCSI, SAS, PCI, PCI-E, UFS, and so on. In addition, the host interface unit 2211 may perform a disk emulating function of supporting the host device 2100 to recognize the SSD 2200 as a general-purpose memory system, for example, a hard disk drive (HDD).

The control unit 2212 may analyze and process the signal SGL inputted from the host device 2100. The control unit 2212 may control operations of internal function blocks of the SSD 2200 according to firmware or software for driving the SSD 2200. The random access memory 2213 may be used as a working memory for driving such firmware or software.

The ECC unit 2214 may generate parity data based on write data to be transmitted to the nonvolatile memory devices 2231 to 223*n*. The generated parity data may be stored, along with the write data, in the nonvolatile memory devices 2231 to 223*n*. The ECC unit 2214 may detect errors of data read out from the nonvolatile memory devices 2231 to 223*n* based on parity data corresponding to the read data. When the detected errors are within a correctable range, the ECC unit 2214 may correct the detected errors.

The memory interface unit 2215 may provide control signals such as commands and addresses to the nonvolatile memory devices 2231 to 223*n* according to control of the control unit 2212. The memory interface unit 2215 may exchange data with the nonvolatile memory devices 2231 to 223*n* according to control of the control unit 2212. For example, the memory interface unit 2215 may provide data stored in the buffer memory device 2220 to the nonvolatile memory devices 2231 to 223*n* or provide data read out from the nonvolatile memory devices 2231 to 223*n* to the buffer memory device 2220.

Figure 7:
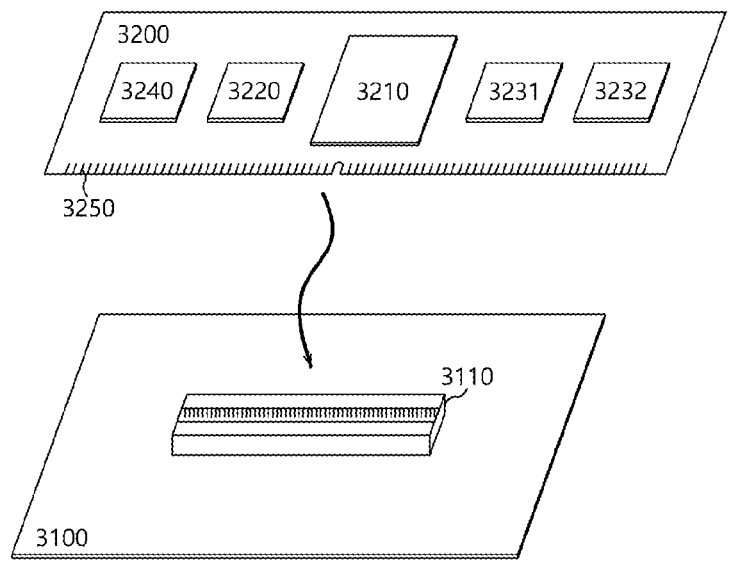
FIG. 7 illustrates a data processing system including a memory system according to an embodiment of the present disclosure.

FIG. 7 illustrates a data processing system 3000 including a memory system according to an embodiment. Referring to FIG. 7, the data processing system 3000 may include a host device 3100 and a memory system 3200. The memory system 3200 may be configured of the memory system 10 described above with reference to FIGS. 1 to 4.

The host device 3100 may be configured in the form of a board such as a printed circuit board. Although not shown in FIG. 7, the host device 3100 may include internal function blocks for performing functions of the host device 3100.

The host device 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the memory system 3200. The controller 3210 may be configured in the same manner as the controller 2210 shown in FIG. 6.

The buffer memory device 3220 may temporarily store write data to be stored in the nonvolatile memory devices 3231 and 3232. Further, the buffer memory device 3220 may temporarily store read data read out from the nonvolatile memory devices 3231 and 3232. The data temporarily stored in the buffer memory device 3220 may be transmitted to the host device 3100 or to the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250 to components of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like and power may be transferred between the host device 3100 and the memory system 3200. The connection terminal 3250 may be configured in various types depending on an interface scheme between the host device 3100 and the memory system 3200. The connection terminal 3250 may be disposed on any one side of the memory system 3200.

Figure 8:
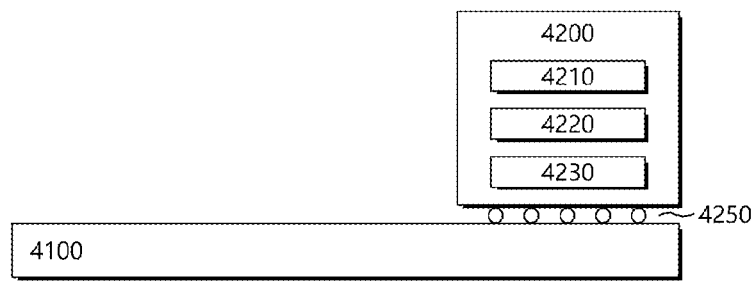
FIG. 8 illustrates a data processing system including a memory system according to an embodiment of the present disclosure.

FIG. 8 illustrates a data processing system 4000 including a memory system according to an embodiment. Referring to FIG. 8, the data processing system 4000 may include a host device 4100 and a memory system 4200. The memory system 4200 may be configured of the memory system 10 described above with reference to FIGS. 1 to 4.

The host device 4100 may be configured in the form of a board such as a printed circuit board. Although not shown in FIG. 8, the host device 4100 may include internal function blocks for performing functions of the host device 4100.

The memory system 4200 may be configured in the form of a surface-mounting type package. The memory system 4200 may be mounted on the host device 4100 through solder balls 4250. The memory system 4200 may include a controller 4210, a buffer memory device 4220, and a nonvolatile memory device 4230.

The controller 4210 may control an overall operation of the memory system 4200. The controller 4210 may be configured in the same manner as the controller 2210 shown in FIG. 6.

The buffer memory device 4220 may temporarily store write data to be stored in the nonvolatile memory device 4230. Further, the buffer memory device 4220 may temporarily store read data read out from the nonvolatile memory device 4230. The data temporarily stored in the buffer memory device 4220 may be transmitted to the host device 4100 or to the nonvolatile memory device 4230 according to control of the controller 4210.

The nonvolatile memory device 4230 may be used as a storage medium of the memory system 4200.

Figure 9:
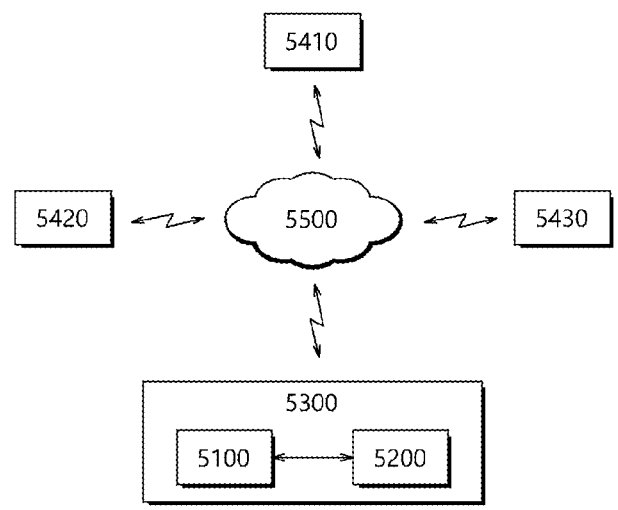
FIG. 9 illustrates a network system including a memory system according to an embodiment of the present disclosure.

FIG. 9 illustrates a network system 5000 including a memory system according to an embodiment. Referring to FIG. 9, the network system 5000 may include a server system 5300 and a plurality of client systems 5410 to 5430 which are coupled to each other through a network 5500.

The server system 5300 may provide data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a memory system 5200. The memory system 5200 may be configured of the memory system 10 illustrated in FIG. 1, the memory system 5200 illustrated in FIG. 5, the memory system 3200 illustrated in FIG. 7, or the memory system 4200 illustrated in FIG. 8. Therefore, the operation described with reference to FIG. 4 may be applied to an operation of the memory system 5200.

FIG. 10 illustrates an example of a nonvolatile memory device 100 included in a memory system according to the embodiment. Referring to FIG. 10, the nonvolatile memory device 100 may include a memory cell array 110, a row decoder 120, a data read/write block 130, a column decoder 140, a voltage generator 150, and a control logic 160. The memory cell array 110 may include a plurality of memory cells MCs which are disposed in intersection regions of word lines WL1 to WLm and bit lines BL1 to BLn.

The row decoder 120 may be coupled to the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the address decoding results. For example, the row decoder 120 may provide word line voltages provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn respectively corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver which stores data provided from the external device in the memory cell array 110 in a write operation. In another example, the data read/write block 130 may operate as the sense amplifier which reads out data from the memory cell array 110 in a read operation.

The column decoder 140 may operate according to control of the control logic 160. The column decoder 140 may decode addresses provided from the external device. The column decoder 140 may couple data input/output lines (or data input/output buffers) with the read/write circuits RW1 to RWn of the data read/write block 130 based on the address decoding results.

The voltage generator 150 may generate voltages to be used in internal operations of the nonvolatile memory device 100. The voltages generated by the voltage generator 150 may be applied to the memory cells MCs of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 160 may control an overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. An operating method of a memory system including a memory device and a controller, the method comprising:
   updating, by the controller, original data of firmware stored in the memory device;
   transmitting, by the controller, a notification signal, which notifies a host device of completion of the updating of the original data, to the host device when the updating of the original data is completed;
   updating, by the controller, backup data of the firmware stored in the memory device after the notification signal is transmitted, and
   rebooting the memory system based on updated original data when sudden power off (SPO) occurs after the notification signal is transmitted to the host device and before the updating of the backup data is completed,
   wherein the updating of the backup data is performed after the memory system is rebooted based on the updated original data.

2. The method of claim 1, further comprising rebooting the memory system based on the backup data when sudden power off (SPO) occurs before the notification signal is transmitted to the host device,
   wherein the updating of the original data is performed again when the memory system is rebooted based on the backup data.

3. The method of claim 1, further comprising rebooting the memory system when the updating of the backup data is completed.

4. The method of claim 3, wherein the rebooting the memory system when the updating of the backup data is completed includes rebooting the memory system based on updated backup data when the rebooting is unable to be performed based on the updated original data.

5. The method of claim 1, further comprising receiving a firmware update command from the host device,
   wherein the updating of the original data is performed based on the firmware update command.

6. The method of claim 5, wherein the receiving of the firmware update command further includes receiving update data for updating the firmware.

7. The method of claim 1, wherein the memory device includes a plurality of memory blocks, and
   the original data and the backup data are respectively stored in first and second memory blocks that are different from each other among the plurality of memory blocks.

8. A memory system comprising:
   a memory device configured to store original data and backup data of firmware; and
   a controller configured to control the memory device,
   wherein the controller controls the memory device to update the original data of the firmware, transmit a notification signal, which notifies a host device of completion of the updating of the original data, to the host device when the updating of the original data is completed, and update the backup data of the firmware after the notification signal is transmitted, and
   wherein when sudden power off (SPO) occurs after the notification signal is transmitted to the host device and before the updating of the backup data is completed, the controller reboots the memory system based on updated original data and controls the memory device to update the backup data after the rebooting is completed.

9. The memory system of claim 8, wherein when sudden power off (SPO) occurs before the notification signal is transmitted to the host device, the controller reboots the memory system based on the backup data of the firmware and controls the memory device to update the original data again after the rebooting is completed.

10. The memory system of claim 8, wherein the controller reboots the memory system based on updated original data when the updating of the backup data is completed.

11. The memory system of claim 10, wherein when the rebooting based on the updated original data is unable to be performed, the controller reboots the memory system based on updated backup data.

12. The memory system of claim 8, wherein the controller includes a host interface which receives a firmware update command from the host device, and
the controller controls the memory device to update the original data based on the firmware update command.

13. The memory system of claim 12, wherein the controller further includes a memory interface which transmits update data to the memory device,
the host interface further receives the update data for updating the firmware, and
the memory device updates the original data and the backup data based on the update data.

14. The memory system of claim 8, wherein the memory device includes a first memory block configured to store the original data and a second memory block configured to store the backup data, the first and second memory blocks being different from each other.

\* \* \* \* \*